United States Patent
Taori et al.

(10) Patent No.: US 6,941,150 B2
(45) Date of Patent: Sep. 6, 2005

(54) COMMUNICATION SYSTEM HAVING BAD FRAME INDICATOR MEANS FOR RESYNCHRONIZATION PURPOSES

(75) Inventors: Rakesh Taori, Eindhoven (NL); Constant Paul Marie Josef Baggen, Eindhoven (NL); Andreas Johannes Gerrits, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 621 days.

(21) Appl. No.: 09/989,256

(22) Filed: Nov. 20, 2001

(65) Prior Publication Data

US 2002/0102942 A1 Aug. 1, 2002

(30) Foreign Application Priority Data

Nov. 21, 2000 (EP) .......................................... 00204132

(51) Int. Cl.[7] .............................. H04B 7/00; H04J 3/06
(52) U.S. Cl. ...................... 455/502; 455/500; 455/513; 455/517; 370/509; 370/512; 370/514
(58) Field of Search ................................. 455/502, 422, 455/67.1, 500, 513, 517, 67.11, 67.14, 69, 70; 370/509, 512, 514, 503

(56) References Cited

U.S. PATENT DOCUMENTS

| | | | |
|---|---|---|---|
| 4,422,171 A | | 12/1983 | Wortley et al. ............... 371/32 |
| 5,130,993 A | | 7/1992 | Gutman et al. ............... 371/42 |
| 6,009,383 A | * | 12/1999 | Mony ........................ 704/200 |
| 6,138,020 A | * | 10/2000 | Galyas et al. ................ 455/436 |
| 6,324,503 B1 | * | 11/2001 | Manjunath et al. .......... 704/226 |
| 6,578,162 B1 | * | 6/2003 | Yung .......................... 714/708 |
| 6,633,536 B1 | * | 10/2003 | Suvanen ..................... 370/216 |
| 2001/0046843 A1 | * | 11/2001 | Alanara et al. .............. 455/95 |
| 2002/0114342 A1 | * | 8/2002 | Yao ............................ 370/429 |

FOREIGN PATENT DOCUMENTS

| | | | |
|---|---|---|---|
| WO | WO9514971 | 1/1995 | ........... G06F/11/10 |
| WO | WO9905807 | 4/1999 | ........... H04B/15/00 |

\* cited by examiner

*Primary Examiner*—Binh Tieu
*Assistant Examiner*—Tuan Pham

(57) ABSTRACT

A communication system (1) comprises a transmitter (2), a receiver (3), and an up/down link communication channel (4, 6) arranged for data communication from the transmitter (2) through the up link communication channel (4) to the receiver (3). The communication system (1) is further arranged to feedback data from the receiver (3) through the down link communication channel (6) to the transmitter (2). The receiver (3) comprises a bad frame indicator (5) for providing a bad frame indication (BFI) upon receipt of a corrupted frame, which is present in synchronized data communicated over the up link communication channel (4); and the transmitter (2) comprises resynchronization means (7) coupled to the down link communication channel (6) for receiving BFI related data and in response thereto recommencing data communication over the up link communication channel (4), in accordance with a resynchronization procedure, which starts from a predetermined state. A fast acting feedback resynchronization procedure for a GSM speech system is presented which prevents substantial error propagation from occurring at the receiver end.

7 Claims, 1 Drawing Sheet

COMMUNICATION SYSTEM HAVING BAD FRAME INDICATOR MEANS FOR RESYNCHRONIZATION PURPOSES

The present invention relates to a communication system comprising a transmitter, a receiver, and an up/down link communication channel arranged for data communication from the transmitter through the up link communication channel to the receiver, whereby the communication system is further arranged to feedback data from the receiver through the down link communication channel to the transmitter.

The present invention also relates to a transmitter and a receiver for application in the communication system.

Such a communication system is known from WO 99/05807. The known communication system comprises a transmitter, a receiver, and an up/down link communication channel. A precoder value signal and a transmission data signal are combined and sent by the transmitter through the up link communication channel to the receiver. During communication decision feedback equalizer coefficients are generated in the receiver and fed back through the down link communication channel to the transmitter. These equalizer coefficients are used to determine new precoder values that compensate for changes occurring in the up link communication channel. The determination of new updated precoder values improves the quality of signals received by the decision feedback equalizer and reduces the changes of what is called a "disruptive retrain". During such a disruptive retrain some form of initializing procedure between transmitter and receiver is necessary in order to put the disrupted data communication back on line. A time effective recovery procedure is not known therefrom.

Therefore it is an object of the present invention to provide a communication system, which is capable of recovering effectively and speedy from a disruption in the data communication.

Thereto the communication system according to the invention is characterized in that the receiver comprises a bad frame indicator for providing a bad frame indication (BFI) upon receipt of a corrupted frame, which is present in synchronized data communicated over the up link communication channel; and that the transmitter comprises resynchronization means coupled to the down link communication channel for receiving BFI related data and in response thereto recommencing data communication over the up link communication channel, in accordance with a resynchronization procedure, which starts from a predetermined state.

In case the synchronous data communication over the up link communication channel is corrupted somehow, a corrupted or bad frame will be received by the receiver. The receipt of such a bad frame is noticed by the bad frame indicator, which then generates a bad frame indication (BFI), such as a BFI flag. In response to BFI related data sent by the receiver to the transmitter the latter is informed through the down link communication channel, about the receipt of one or more bad frames by the receiver. In order to save valuable time the transmitter is preferably informed by return about the receipt of bad frames by the receiver. This prevents the receipt of further frames by the receiver, which can not be handled to a full extent because of the earlier receipt of a bad frame. The transmitter can now take speedy appropriate measures to correct a disturbed synchronization between transmitter and receiver as soon as possible. It is important that synchronization can be restored in a short period of time, because further processing of a bad frame bit content by further circuits at the receiver end, such as in decoder circuits and the like, generally results in a propagation of bit errors, which may extend over several frame periods. This may even lead to an accumulation of bit decision errors resulting in unpleasant and annoying artifacts in the quality of decoded speech, audio and/or video signals, which can hardly be corrected easily.

Advantageously the communication system according to the present invention limits error propagation significantly and allows the application of various ways and levels of restoring a proper synchronization in a speedy way. The limited error propagation is also due to the predetermined, possibly dynamic, state—however known to the transmitter and to the receiver—where from the resynchronization procedure starts. This limits the error response time to a detected bad frame considerably, such that the detrimental error propagation effects are reduced. In fact the possibly partial reconstruction of a bad frame is not so much of a problem, but the error propagation effects there after cause the problems to mitigated.

Examples of applicable up/down link communication channels can be found in telephone, such as GSM networks, LAN or cable networks, Internet and the like. Of course channels may also be combined from different networks, such that for example the up link channel comes from a cable network, while the down link channel comes from a telephone network.

An embodiment of the communication system according to the invention is characterized in that the transmitter and receiver comprise an encoder state machine and decoder state machine respectively, whereby at least the encoder state machine is resynchronized to said predetermined state at recommencing data transmission.

Such a resynchronization of states of encoder and decoder state machines is in particular effective for improving the quality of decoded signals, in case a delay in the bad frame notification to the transmitter encoder is less than the error propagation delay. In that case the error propagation delay can advantageously be decreased by a subsequent resynchronization of encoder and decoder state machines.

A further embodiment of the communication system according to the If invention is characterized in that the resynchronization means include a mutually coupled resynchronization encoder decoder pair for implementing the resynchronization procedure.

It is an advantage of the communication system according to the invention that these resynchronization means make it possible, that upon occurrence of a bad frame at the receiver end the resynchronization encoder decoder pair exactly follows those steps that the decoder at the receiver end is supposed to follow regarding the frame(s) that was/were incorrectly received. It is a further advantage that this resynchronization procedure does not imply any change to be made in the decoder, as the bad frame data which is fed back to the transmitter allows the transmitter decoder to effect resynchronization between transmitter and receiver. It turns out that substantial advantage can be achieved with this resynchronization procedure in speech coding systems, such as in a GSM speech coding system.

A simply to implement embodiment of the communication system according to the invention capable of achieving various levels of retransmission is characterized in that the resynchronization means are arranged for effecting at least a partial reset of the transmitter upon receipt of BFI related data from the receiver.

Advantageously a full reset is only effected in case a full frame is completely corrupted, needing a complete retransmission of the frame concerned. In case only a part of a received frame is corrupted, only the part concerned or only essential parameters of the bad frame will be (re)transmitted to the receiver. In the cases of a partial reset the BFI related data sent back over the down link channel will provide an indication that initiates such a partial reset to be performed. In those cases a lost frame or part thereof could be replaced by a bad frame from a bad frame handling algorithm, such that for example the lost frame or a part thereof is retransmitted or additional redundant information is transmitted, enabling the decoder at the receiver end to reconstruct the lost frame or part thereof.

A still further embodiment of the communication system characterized in that the bad frame indicator is arranged for providing BFI related data containing acknowledgement information about the correct receipt of at least subsets of a frame and/or erasure information about the received bits in a frame.

This embodiment provides more detailed feedback about which bits or set of bits—possibly—went wrong at the receiver end. As a consequence the retransmission or correction of the bits or sets of bits, or an essential part thereof that went wrong can be effected fast and efficient, such that error propagation can be kept to a minimum.

At present the communication system, and transmitter and receiver according to the invention for application therein will be elucidated further together with its additional advantages while reference is being made to the appended drawing, wherein similar components are being referred to by means of the same reference numerals.

Figure 1:
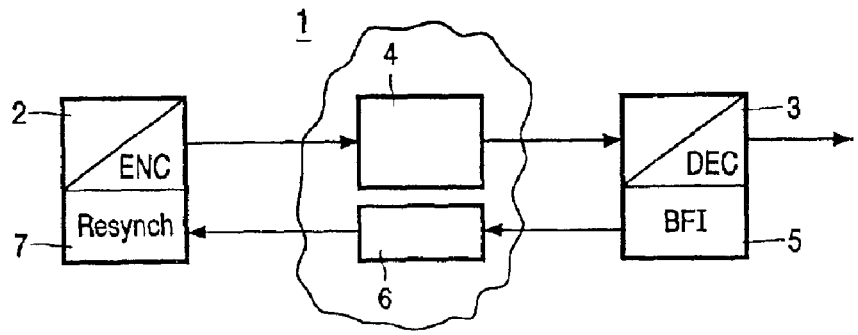
FIG. 1 shows a general outline of the communication system according to the invention.

FIG. 1 shows a communication system 1, comprising a transmitter 2 and a receiver 3, interconnected through an up link communication channel 4 allowing data communication from the transmitter 2 to the receiver 3. The data communication is frame organized, such that synchronized data is communicated over the channel 4. Such a frame usually is 20 msec long in a speech system 1. The receiver 3 may receive frames that are corrupted during the data communication from transmitter 2 to receiver 3. The frames contain bits. It may be that only part of the bits in a corrupted frames are not reliable or bad. The receiver 3 comprises a bad frame indicator 5 for providing a Bad Frame Indication (BFI), such as a BFI flag to indicate the receipt of a bad frame, or an at least partially corrupted frame. The communication system further comprises a down link communication channel 6 for communicating feedback data, generally containing BFI related data, such as for example the BFI flag. If the feedback data only contains one BFI flag per frame, then the channel 6 may advantageously have a very small transmission bandwidth. The communication channels 4 and 6 may be physically separate or may be embodied by one transmission medium. The channels 4, 6 may form part of a network, such as a cable network or the GSM network. For example the down link channel 6 may be formed by an Internet link.

The transmitter 2 comprises resynchronization means 7 coupled to the channel 6 for receiving in particular the BFI related data. If a corrupted/bad frame is detected and the BFI related data is received over the channel 6, the resynchronization means 7 recommence the bad data communication over the up link channel 4 by initiating a resynchronization procedure. The resynchronization procedure, which will be described hereafter starts from a predetermined state, which is known to both the transmitter 2 and the receiver 3. This predetermined state may for example emanate from a full reset of both the transmitter 2 and receiver 3 after detection of a bad frame, or may emanate from a partial reset. In case of a partial reset transmitter 2 and receiver 3 are not set back to their basic states. A partial reset is possible if the bad frame indicator 5 of the receiver 3 indicates through the down link channel 6 which part or subsets of a frame it received correctly, and/or which part it did not receive correctly.

The part concerned or the whole frame may then be resent to the receiver 3 and processed further in a speedy way.

It is also possible to send back so called erasure information about the bits that were received in a frame, in order to have likelihood information available for statistical evaluation of the received bits. This evaluation may then for example result in essential information to be sent to the receiver 3 during a retransmission in the resynchronization procedure, in order to allow the receiver 3 to build up or correct the corrupted frame or sub frame as soon as possible, such that a propagation of errors upon further processing of the received frames is minimal. Various levels of sophistication of the resynchronization procedure with feedback can be thought of, to achieve a good trade-off between computational complexity and performance.

Generally the transmitter 2 comprises an encoder in the form of an encoder state machine ENC. Similarly the receiver 3 comprises a decoder in the form of a decoder state machine DEC. In steady state these state machines, apart from a process and transmission channel delay, will operate synchronously. In particular these state machines ENC and DEC are brought back after detection of a bad frame, to states correspondingly reflecting the above mentioned predetermined states. Both the encoder and the decoder machines ENC and DEC should (re)start from a common state, which is predetermined in the sense that the state must be known to both machines encoder and decoder. This could be the state prior to the BFI-flagged frame, i.e. a state known to both machines, but a state which is dynamic in this case. In case of a full reset both machines start from the very beginning, which state is generally not dynamic, but fixed. After a partial reset with or without available erasure information only a corrupted part of the frame will be resent or corrected were after synchronous operation is restored faster, without having to start from the very beginning.

Figure 2:
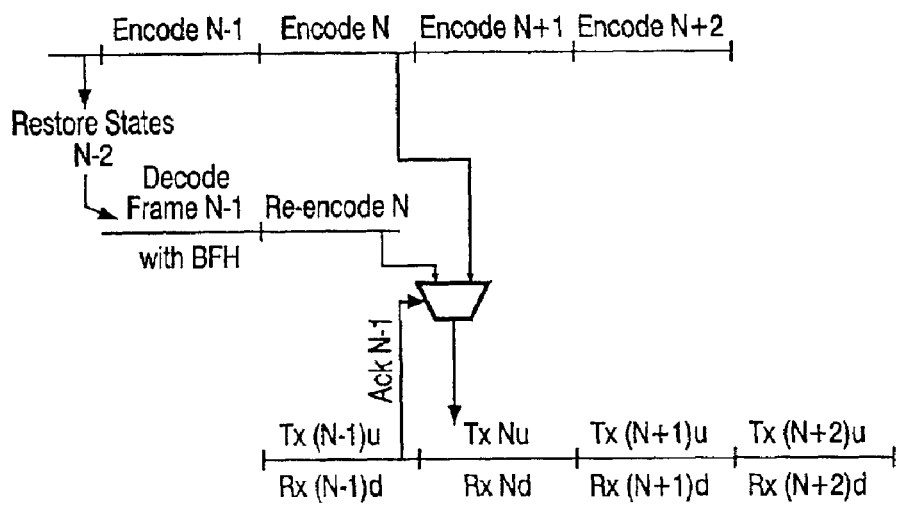
FIG. 2 shows a diagram of a resynchronization procedure using feedback information in an embodiment of the communication system according to the invention.
Figure 3:
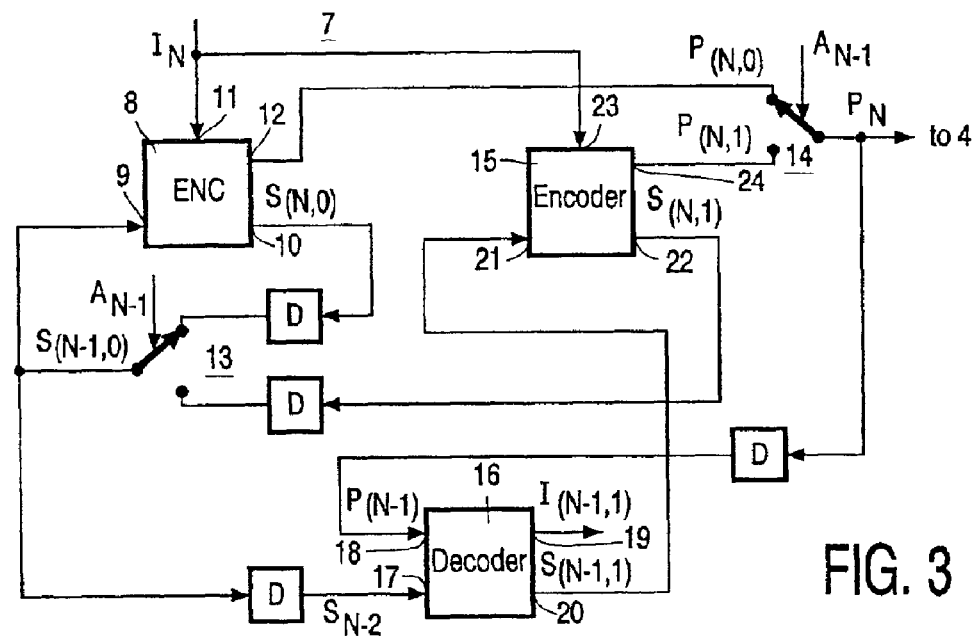
FIG. 3 an embodiment of resynchronization means for application in the communication system of FIG. 1.

By way of example FIG. 2 shows a diagram of a resynchronization procedure using feedback information in the communication system 1, whereas FIG. 3 provides the corresponding resynchronization means 7 for application therein. Here the encoder ENC in the transmitter 2 enters such a predetermined dynamic state that it exactly follows the steps that the decoder DEC in the receiver 3 is supposed to follow for the frame—in this case N−1—that was incorrectly received. This is done by re-encoding frame N with the synchronized history in the transmitter 2. Such a resynchronization procedure requires no changes in the decoder DEC in the receiver 3 and can easily be implemented in a GSM speech coding system.

The resynchronization means 7 of FIG. 3 comprises an encoder 8, which performs the known functions of the encoder ENC. The encoder ENC has a state input 9 for states $S_{(N-1,0)}$ (N−1 indicates the frame N−1, and the "0" indicates an error free condition, whereas an "1" indicates an erroneous condition), a state output 10 for new states $S_{(N,0)}$, a frame collect input 11 for the data input stream $I_N$ containing the samples of frame N, and a parameter output 12 for parameters $P_{(N,0)}$. D represents a one clock delay circuit, such as a shift register. Two two-way controllable switches 13 and 14 can be switched over by means of an acknowledgement information signal $A_{N-1}$, which is here the BFI flag received from the receiver 3 indicating that an error occurred in frame N−1. In the error free condition the switches have the positions as shown and the collected input stream $I_N$ and the states $S_{(N-1,0)}$ after encoding provide new states $S_{(N,0)}$ and parameters $P_{(N,0)}$ in steady state, which parameters are being sent to the receiver 3 through the up link communication channel 4.

The resynchronization means 7 further comprise a further encoder 15 and a decoder 16 both for handling a bad frame procedure at the transmitter end. Decoder 16 has a state input 17 for previous states $S_{(N-2)}$ derived through circuit D from states $S_{(N-1,0)}$, a previous parameter input 18 for previous states $P_{(N-1)}$, a frame output 19 for data stream $I_{(N-)1,1}$, and a state output 20 for states $S_{(N-1,1)}$. Output 20 is coupled to state input 21 of encoder 15, whose state output 22 couples states $S_{(N,1)}$ through delay circuit D to the change over terminal of switch 13. Data input stream $I_N$, is also applied to encoder input 23, and parameter output 24 thereof is fed to the change over terminal of switch 14. Suppose an error occurred in frame N−1, as indicated by the acknowledge signal $A_{N-1}$, then switches 13 and 14 switch over and frame N−1 is decoded by decoder 16 to reveal states $S_{(N-1,1)}$, which are used for encoding in encoder 15 to reveal the parameters $P_{(N,1)}$, which are sent to the receiver 2 as the corrected version of the corrupted frame N−1.

Summarizing, this bad frame handling algorithm implemented by the GSM system, follows the steps:

1. Collect samples of frame N: $I_N$.
2. Encode frame N with states $S_{(N-1,0)}$ and store the parameters in $P_{(N,0)}$.
3. Store states after encoding frame N: $S_{(N,0)}$.
4. Retrieve states of frame N−2: $S_{(N-2)}$.
5. Decode frame N−1 with decoder 16 and store the states in $S_{(N-1,1)}$.
6. Re-encode frame N using the states $S_{(N-1,1)}$ and store parameters in $P_{(N,1)}$.
7. Read acknowledge $A_{N-1}$.
8. Transmit either $P_{(N,0)}$ or $P_{(N,1)}$ depending on $A_{N-1}$, i.e. if $A_{N-1}=0$ (error free reception of frame N−1) transmit $P_{(N,0)}$, else transmit $P_{(N,1)}$.
9. Assign states $S_{(N-1,0)}$ depending on $A_{N-1}$. $S_{(N-1,0)}=S_{(N,0)}$ if $A_{N-1}=0$ else $S_{(N-1,0)}=S_{(N,1)}$.
10. Increment frame counter: N=N+1.
11. Go to step 1.

It should be noted that the expressions up-link and down-link only refer to a two way communication path between a transmitter and a receiver. The two ways may be physically two entirely different and remote paths, but may also be combined in one and the same communication channel, glass fiber, cable or the like.

Whilst the above has been described with reference to essentially preferred embodiments and best possible modes it will be understood that these embodiments are by no means to be construed as limiting examples of the devices concerned, because various modifications, features and combination of features falling within the scope of the appended claims are now within reach of the skilled person.

What is claimed is:

1. A communication system comprising a transmitter, a receiver, and an up/down link communication channel arranged for data communication from the transmitter through the up link communication channel to the receiver, whereby the communication system is further arranged to feedback data from the receiver through the down link communication channel to the transmitter, wherein the receiver comprises a bad frame indicator for providing a bad frame indication (BFI) upon receipt of a corrupted frame, which is present in synchronized data communicated over the up link communication channel; and that the transmitter comprises resynchronization means coupled to the down link communication channel for receiving BFI related data and in response thereto recommencing data communication over the up link communication channel, in accordance with a resynchronization procedure, which starts from a predetermined state.

2. The communication system according to claim 1, wherein the transmitter and receiver comprise an encoder state machine (ENC) and decoder state machine (DEC) respectively, whereby at least the encoder state machine (ENC) is brought back to said predetermined state at recommencing data transmission.

3. The communication system according to claim 1, wherein the resynchronization means include a mutually coupled resynchronization encoder decoder pair for implementing a possible resynchronization procedure.

4. The communication system according to claim 1, wherein the resynchronization means (7) are arranged for effecting at least a partial reset of the transmitter upon receipt of BFI related data from the receiver.

5. The communication system according to claim 4, wherein the bad frame indicator is arranged for providing BFI related data containing acknowledgement information ($A_{N-1}$) about the correct receipt of at least subsets of a frame and/or erasure information about the received bits in the frame.

6. A transmitter for application in a communication system according to claim 1, the communication system comprising the transmitter, a receiver, and an up/down link communication channel arranged for data communication from the transmitter through the up link communication channel to the receiver, whereby the communication system is further arranged to feedback data from the receiver through the down link communication channel to the transmitter, wherein the receiver comprises a bad frame indicator for providing a bad frame indication (BFI) upon receipt of a corrupted frame, which is present in synchronized data communicated over the up link communication channel; and that the transmitter comprises resynchronization means coupled to the down link communication channel for receiving BFI related data and in response thereto recommencing data communication over the up link communication channel, in accordance with a resynchronization procedure, which starts from a predetermined state.

7. A receiver for application in a communication system according to claim 1, the communication system comprising a transmitter, the receiver, and an up/down link communication channel arranged for data communication from the transmitter through the up link communication channel to the receiver, whereby the communication system is further arranged to feedback data from the receiver through the down link communication channel to the transmitter, wherein the receiver comprises a bad frame indicator for providing a bad frame indication (BFI) upon receipt of a corrupted frame, which is present in synchronized data communicated over the up link communication channel; and that the transmitter comprises resynchronization means coupled to the down link communication channel for receiving BFI related data and in response thereto recommencing data communication over the up link communication channel, in accordance with a resynchronization procedure, which starts from a predetermined state.

* * * * *